W. R. WILSON.
BEARING STRUCTURE.
APPLICATION FILED JAN. 12, 1918.
1,299,277.
Patented Apr. 1, 1919.
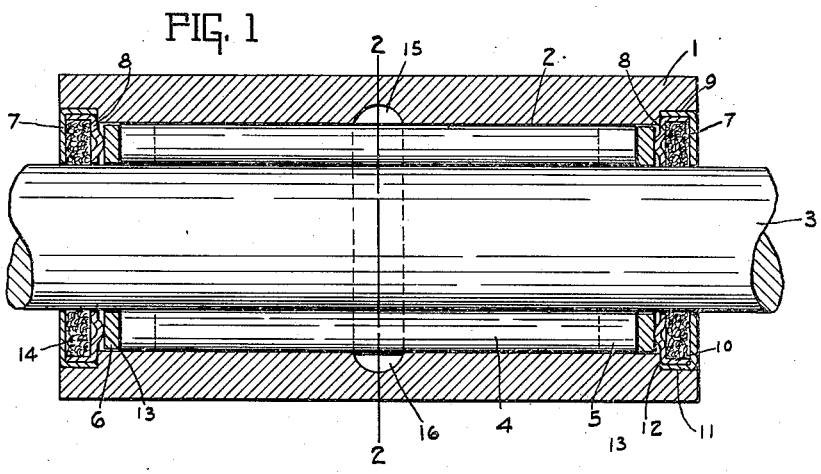
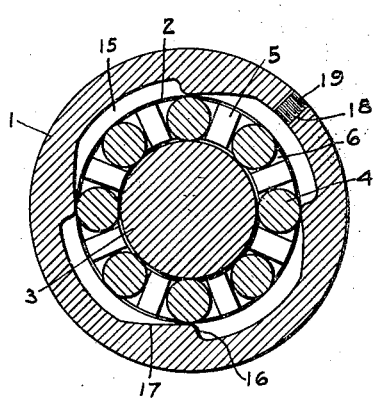
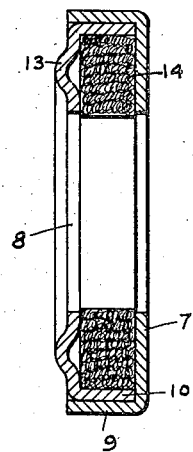
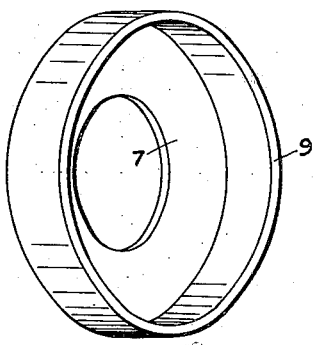
INVENTOR
WILLIAM R. WILSON
BY
Lockwood & Lockwood
ATTORNEYS.

UNITED STATES PATENT OFFICE.

WILLIAM R. WILSON, OF TERRE HAUTE, INDIANA.

BEARING STRUCTURE.

1,299,277.  Specification of Letters Patent.  Patented Apr. 1, 1919.

Application filed January 12, 1918. Serial No. 211,519.

*To all whom it may concern:*

Be it known that I, WILLIAM R. WILSON, a citizen of the United States, and a resident of Terre Haute, county of Vigo, and State of Indiana, have invented a certain new and useful Bearing Structure; and I do hereby declare that the following is a full, clear, and exact description thereof, reference being had to the accompanying drawings, in which like numerals refer to like parts.

This invention relates to improvements in anti-friction bearings and is designed primarily for use in connection with parts which slowly rotate, such as mine car wheels, plow colters, cultivator wheels and the like. One feature of the invention is the provision of a plurality of bearing rollers and spacing members therefor adapted to be positioned around a shaft or axle and within the bearing. A further feature of the invention is the provision of packing members for the ends of the bearing to prevent lubricant from exuding from the bearing around the shaft or axle. A further feature of the invention is the provision of an oil receiving channel in the peripheral surface of the bearing, which channel serves as a well to retain surplus lubricant, and a further feature of the invention is the provision of means in said channel for causing the lubricant to descend onto the bearing rollers and axle as the bearing revolves.

The nature of the invention will be more fully understood from the accompanying drawings and the following description and claims:

Figure 1 is a longitudinal central sectional view through a bearing. Fig. 2 is a transverse sectional view thereof, as seen on line 2—2 of Fig. 1. Fig. 3 is an enlarged central sectional view through the packing members for the bearing and Fig. 4 is an enlarged perspective view of one of the housings composing the packing members.

Referring to the drawings in which similar reference numerals designate corresponding parts throughout the several views, 1 indicates a bearing, which may be of any preferred construction and used in connection with pulleys, wheels or any device adapted to rotate slowly around an axle or shaft, said bearing being provided with a longitudinal bore 2, through which extends a shaft or axle 3.

The diameter of the bore 2 is larger than the diameter of the shaft 3 and between said shaft and bearing are a plurality of rollers 4, the ends of which are positioned between wings 5, of retaining members 6, said retaining members holding the rollers in proper spaced relation.

The rollers 4 and retaining members 6 are held within the bearing 1 by providing a pair of washers 7 and 8 at each end of the bearing 1, said washers having flanges 9 and 10 extended at right angles to and at the peripheral edges of the washers, the washer 7 being of greater diameter than the washer 8, so that the flange 10 may pass within and telescope with the flange 9. The ends of the bearing 1 are provided with recesses 11 which are of greater diameter than the diameter of the bore 2, thus forming shoulders 12 against which the washers abut when entered into the recess, and in order to provide a minimum amount of frictional surface, the washers 8 against which the retaining members 6 bear, having parts thereof struck out to form circular ribs 13 for engagement with the retaining members, said ribs also forming cups into which lubricant will gather, thus keeping the engaging surfaces between the washers and retaining members well lubricated.

In order to provide a packing to prevent the escape of lubricant around the shaft or axle, a packing ring 14, of any suitable fibrous material, such as felt, is placed between the washers 7 and 8 before they are telescoped with each other, thereby housing the packing ring within the washers and as the flange 10 of the washer 8 abuts against the face of the washer 7, it is impossible to squeeze or flatten the packing ring, and should the packing ring lose its absorbing qualities the washers can be readily separated and a new ring inserted.

In order to provide a well or chamber in which to carry surplus lubricant, a channel 15 is formed in the inner wall of the bearing 1 and when the bearing is standing idle more or less of the lubricant within the bearing will gather in said channel and in order to cause the lubricant to positively leave the channel and be directed on to the bearing rollers, said channel is provided at intervals with breakers 16, one or both faces of the breakers having inclined faces 17, which when the bearing rotates will cause the lubricant within the channel to flow inwardly and over the bearing rollers, and as the apex of the breakers are adjacent the periphery of the bearing rollers, it will be impossible for the lubricant to pass over the breakers and remain within the channel. Any suitable means may be provided for introducing lubricant into the bearing, the bearing in the present instance being provided with an opening 18 through which the lubricant may be introduced into the bearing, said opening being normally closed by means of a screw 19.

This form of device can be very cheaply constructed and can readily be applied to use in connection with any suitable form of hub or bearing which slowly rotates and when properly applied to use a perfect lubricant carrying chamber is provided so as to keep all of the working parts of the bearing in properly lubricated condition.

The invention claimed is:—

1. In a bearing structure, a hollow bearing, said bearing having a circular channel extending in a straight line around the interior of the bearing for the reception of lubricant, and inclined breakers at intervals in each channel for causing the lubricant to leave the channel when the bearing is rotated slowly.

2. A bearing structure having a peripheral channel for the reception of lubricant, and breakers arranged circumferentially of the bearing and at intervals in said channel adapted to cause the lubricant to leave the channel when the bearing is rotated slowly.

3. In a bearing structure, a hollow bearing, bearing rollers within the bearing, said bearing having a peripheral channel for the reception of lubricant, and longitudinally extending inclined breakers at intervals in said channel adapted to cause the lubricant in the channel to move on to the bearing rollers when the bearing rotates slowly.

In witness whereof, I have hereunto affixed my signature in the presence of the witnesses herein named.

WILLIAM R. WILSON.

Witnesses:
   THOS. W. RECORDS,
   ELMER E. SOUDER.